(12) United States Patent
Aston et al.

(10) Patent No.: US 8,973,873 B2
(45) Date of Patent: Mar. 10, 2015

(54) SPACECRAFT PROPELLANT TANK MOUNT

(71) Applicant: The Boeing Company, Chicago, IL (US)

(72) Inventors: Richard W. Aston, Brea, CA (US); Michael John Langmack, Huntington Beach, CA (US); Brett T. Cope, Long Beach, CA (US); Anna M. Tomzynska, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 356 days.

(21) Appl. No.: 13/652,101

(22) Filed: Oct. 15, 2012

(65) Prior Publication Data

US 2014/0103164 A1    Apr. 17, 2014

(51) Int. Cl.
B64G 1/66 (2006.01)
B64G 1/40 (2006.01)

(52) U.S. Cl.
CPC .................................. B64G 1/402 (2013.01)
USPC ..................................... 244/172.3; 220/562

(58) Field of Classification Search
USPC .................... 244/172.2, 172.3; 220/4.14, 562
See application file for complete search history.

(56) References Cited

U.S. PATENT DOCUMENTS

| | | | | |
|---|---|---|---|---|
| 3,929,306 A | * | 12/1975 | Faget et al. ................ | 244/159.3 |
| 4,829,784 A | * | 5/1989 | Berg et al. ...................... | 62/467 |
| 5,411,226 A | * | 5/1995 | Jones et al. ................ | 244/173.3 |
| 5,529,264 A | | 6/1996 | Bedegrew et al. | |
| 5,605,308 A | * | 2/1997 | Quan et al. ................. | 244/173.3 |
| 5,613,653 A | * | 3/1997 | Bombled et al. ........... | 244/173.1 |
| 6,206,327 B1 | * | 3/2001 | Benedetti et al. .......... | 244/159.4 |
| 6,267,330 B1 | * | 7/2001 | Cochran ...................... | 244/172.2 |
| 6,357,698 B1 | * | 3/2002 | DiVerde et al. ............ | 244/173.3 |
| 6,789,767 B2 | * | 9/2004 | Mueller et al. ............. | 244/173.3 |
| 7,658,414 B2 | * | 2/2010 | Watanabe et al. ........... | 280/834 |
| 8,136,765 B2 | * | 3/2012 | Geneste et al. ............ | 244/158.5 |
| 8,196,868 B2 | * | 6/2012 | Kutter et al. ................ | 244/171.7 |
| 8,393,582 B1 | * | 3/2013 | Kutter et al. ................ | 244/172.3 |
| 2002/0179776 A1 | * | 12/2002 | Mueller et al. ............. | 244/158 R |
| 2010/0264275 A1 | * | 10/2010 | Behruzi et al. ............. | 244/172.2 |
| 2012/0227374 A1 | | 9/2012 | Zegler | |
| 2013/0299641 A1 | * | 11/2013 | Aston et al. ................ | 244/171.1 |
| 2014/0061386 A1 | * | 3/2014 | Peterka et al. ............. | 244/171.5 |

FOREIGN PATENT DOCUMENTS

| | | |
|---|---|---|
| CN | 103448919 | 12/2013 |
| EP | 2662289 | 11/2013 |
| WO | 01/56883 | 8/2001 |

OTHER PUBLICATIONS

GB, Combined Search and Examination Report, Application No. GB1316482.7 (Apr. 4, 2014).

* cited by examiner

Primary Examiner — Benjamin P Lee
(74) Attorney, Agent, or Firm — Clifford G. Cousins

(57) ABSTRACT

A spacecraft having a primary structural frame and a propellant tank, in which the spacecraft may include a tank mount adopted to engage a portion of the propellant tank, the tank mount being configured to transfer launch loads directly from the propellant tank to a lunch vehicle interface ring.

18 Claims, 7 Drawing Sheets

SPACECRAFT PROPELLANT TANK MOUNT

BACKGROUND

The present disclosure is directed spacecraft and, more particularly, to spacecraft propellant tank mount systems.

It is desirable to minimize the mass or weight (i.e., the force exerted on a mass by Earth's gravity) of a spacecraft. Each kilogram of spacecraft mass that is to be launched into Earth orbit may require as much as 10 kilograms of fuel. Accordingly, it is desirable to minimize spacecraft mass in order to reduce the overall cost and fuel requirements of a launch vehicle. Further, by reducing the mass of the spacecraft propulsion structure, more available spacecraft mass may be devoted to instrumentation and other spacecraft payload. One mechanism for reducing spacecraft mass is to eliminate any unnecessary structure from the spacecraft.

These considerations apply to spacecraft powered by electric propulsion systems, as well as to spacecraft that may employ chemical, or hybrid propulsion systems. Currently, spacecraft of the type having a central thrust tube design require internal propellant tanks that match the tube diameter to transfer launch loads to the cylindrical wall of the central thrust tube with minimal bending. A disadvantage with such a design is that it may require a custom tank design to match the inside diameter of the central thrust tube. Further, such a design may not work well with electric propulsion spacecraft because the size of the propellant tank required by a mission may be less than what would be required to fill the interior of the central thrust tube. Accordingly, there is a need for a spacecraft having a propellant tank mount that may be used in conjunction with a central thrust tube, but does not need to match the interior diameter of the central thrust tube.

SUMMARY

The disclosure is directed to a spacecraft having a primary structural frame and a propellant tank, the spacecraft including a tank mount adapted to engage a portion of the propellant tank, the tank mount being configured to transfer launch loads directly from the propellant tank to the launch vehicle interface ring. In one aspect, the propellant tank mount includes a conical shell having a first end adapted to engage an end of a propellant tank, and a second end adapted to engage a launch vehicle interface ring. In another aspect, a method of mounting a propellant tank to a spacecraft having a primary structural frame includes providing a tank support adapted to engage a portion of the propellant tank, the tank support being configured to transfer launch loads directly from a propellant tank to a launch vehicle interface ring.

An advantage of embodiments of the disclosed spacecraft, propellant tank mount and method is that the propellant tank may be supported independently of the central thrust tube of the spacecraft. Consequently, the spacecraft and mount may accommodate propellant tanks of a variety of shapes and diameters. The shape and diameter of the propellant tank need not be dictated by the inside diameter of the central thrust tube. Another advantage of embodiments of the disclosed spacecraft, propellant tank mount and method is that the launch load of the propellant tank may be transferred directly from the propellant tank to the launch vehicle interface ring, and not borne by the central thrust tube of the spacecraft.

The disclosed design may provide a mass-efficient solution because the propellant tank load (i.e., the force exerted by the mass of the propellant tank during launch, and when the launch vehicle is accelerating, as a result of acceleration of the launch vehicle and spacecraft) may bypass the spacecraft's primary structure. This may enable use of a simplified and relatively lighter primary structure, so that a larger portion of the available mass of the spacecraft may be allotted to instrumentation and other spacecraft payload.

Other objects and advantages of the disclosed structure will be apparent from the following description, the accompanying drawings and the appended claims.

DETAILED DESCRIPTION

Figure 1:
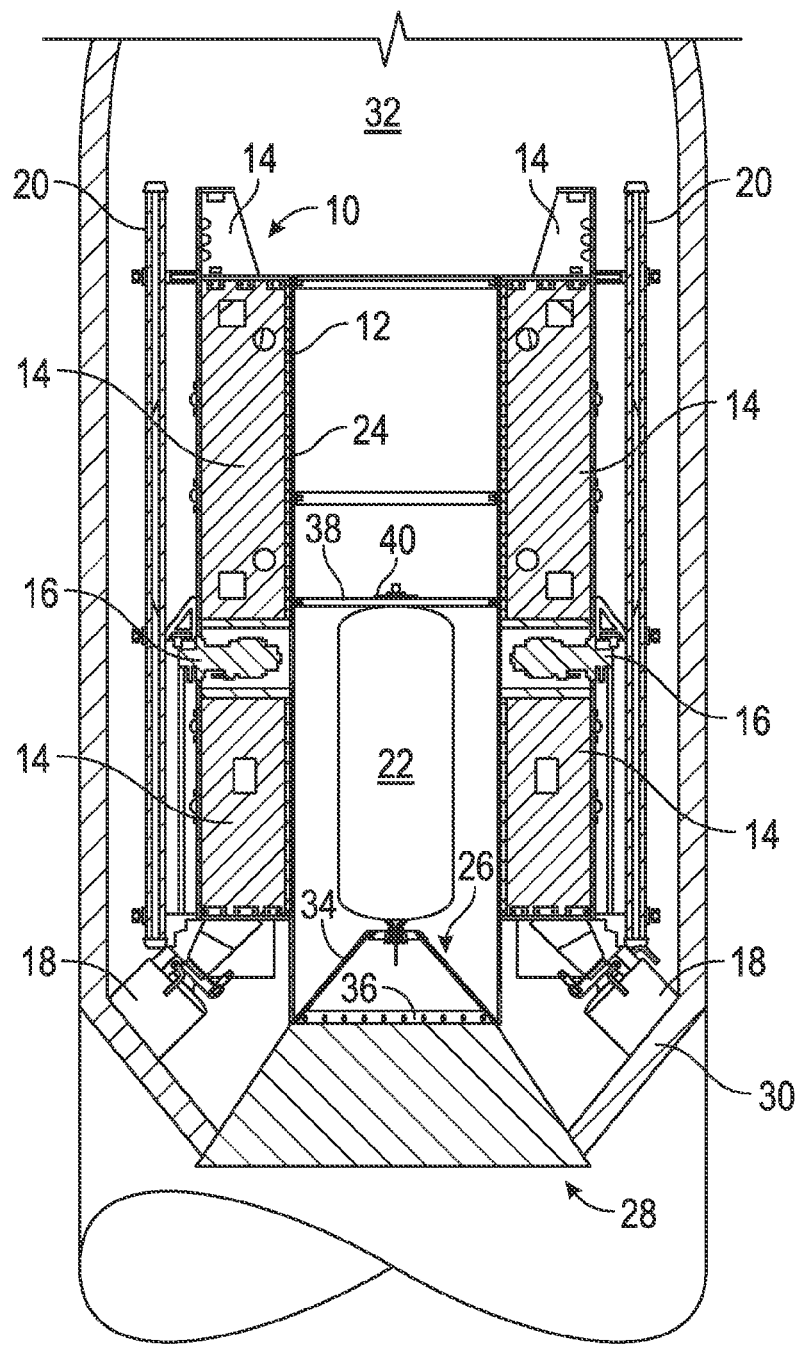
FIG. 1 is a side elevation in section of an embodiment of a spacecraft incorporating the disclosed tank mount, shown mounted in a launch vehicle fairing.

As shown in FIG. 1, the disclosed spacecraft, generally designated 10, may include a primary structural frame that may be in the form of a cylindrical central thrust tube 12 that extends substantially the entire length of the spacecraft. The thrust tube 12 also may support stiffener panels 14, solar wing drives 16 and thrusters 18. Thrusters 18 may be used for attitude control and/or moving the spacecraft 10 to a different orbit. The solar wing drives 16 may support solar panels 20.

The thrusters 18 may be include an electric propulsion units connected to a propellant tank 22. In embodiments, the thrusters 18 may be gridded electrostatic ion thrusters, or Hall effect thrusters. The propellant tank 22 may contain xenon gas propellant under pressure and may be dimensioned to be spaced from the inner surface 24 of the central thrust tube 12. Although shown in FIG. 1 as having a cylindrical shape, in embodiments the propellant tank 22 may be spherical, elliptical or oval in shape. In an embodiment, the propellant tank 22 may be a metallic pressure vessel with a composite overwrap reinforcement. In embodiments, the propellant tank 22 may be made of aluminum or titanium, and may or may not have overwrap reinforcement.

Figure 3:
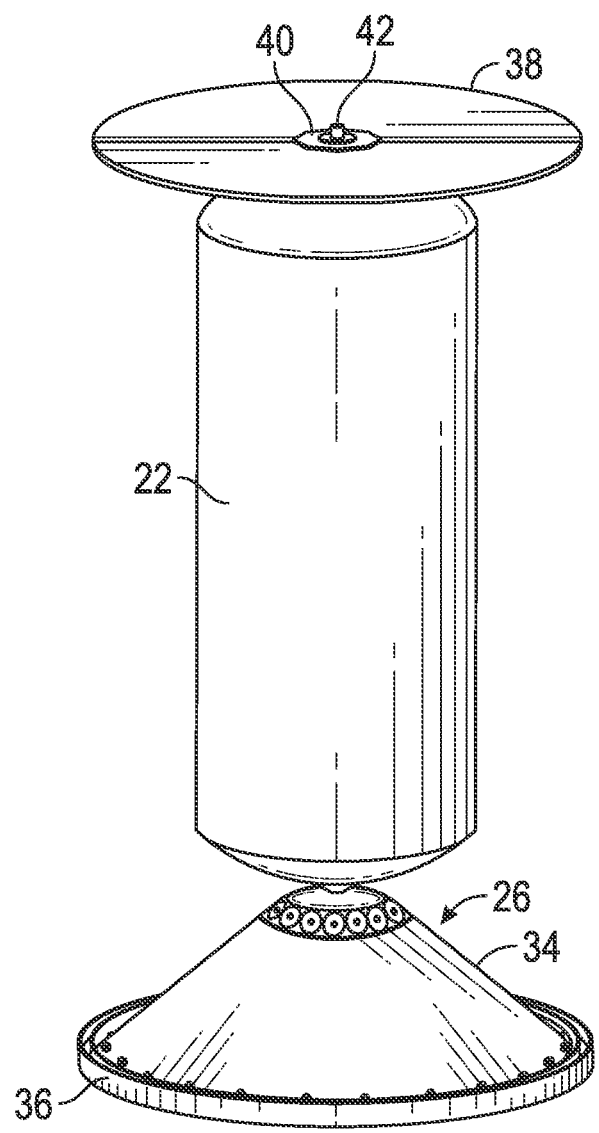
FIG. 3 is a perspective view of the disclosed tank support of FIG. 1.

As shown in FIGS. 1 and 3, the spacecraft 10 may include a tank mount, generally designated 26. The tank mount 26 may serve to attach the spacecraft 10 to the base 28 of a launch vehicle 30, so that the spacecraft 10 may be positioned within the payload region 32 of the launch vehicle. The tank mount 26 may include a conical shell 34 that may be made of a lightweight, strong composite material. In an embodiment, the material may include graphite or carbon fiber and may have a honeycomb structure. In other embodiments, the conical shell 34 may be made of metal, such as titanium, steel or aluminum alloy. The conical shell 34 may be attached to a launch vehicle interface ring 36, which may be part of the base 28 of a launch vehicle 30.

At an opposite end of the propellant tank 22, the tank mount 26 may include a forward tank support panel 38. The forward tank support panel 38 may be disk-shaped and sized to engage the inner periphery 24 of the central thrust tube 12. The forward tank support panel 38 may be a solid disk, as shown, or may have voids to reduce weight. The forward tank support panel 38 may be attached to the propellant tank 22 by a pivotal mount 40, such as the monoball bearing axial slip joint shown. Other types of pivotal mounts may be employed. The forward tank support panel 38 may be attached to the inner periphery 24 of the central thrust tube 12 by welding, brazing, adhesives or other means.

Figure 4:
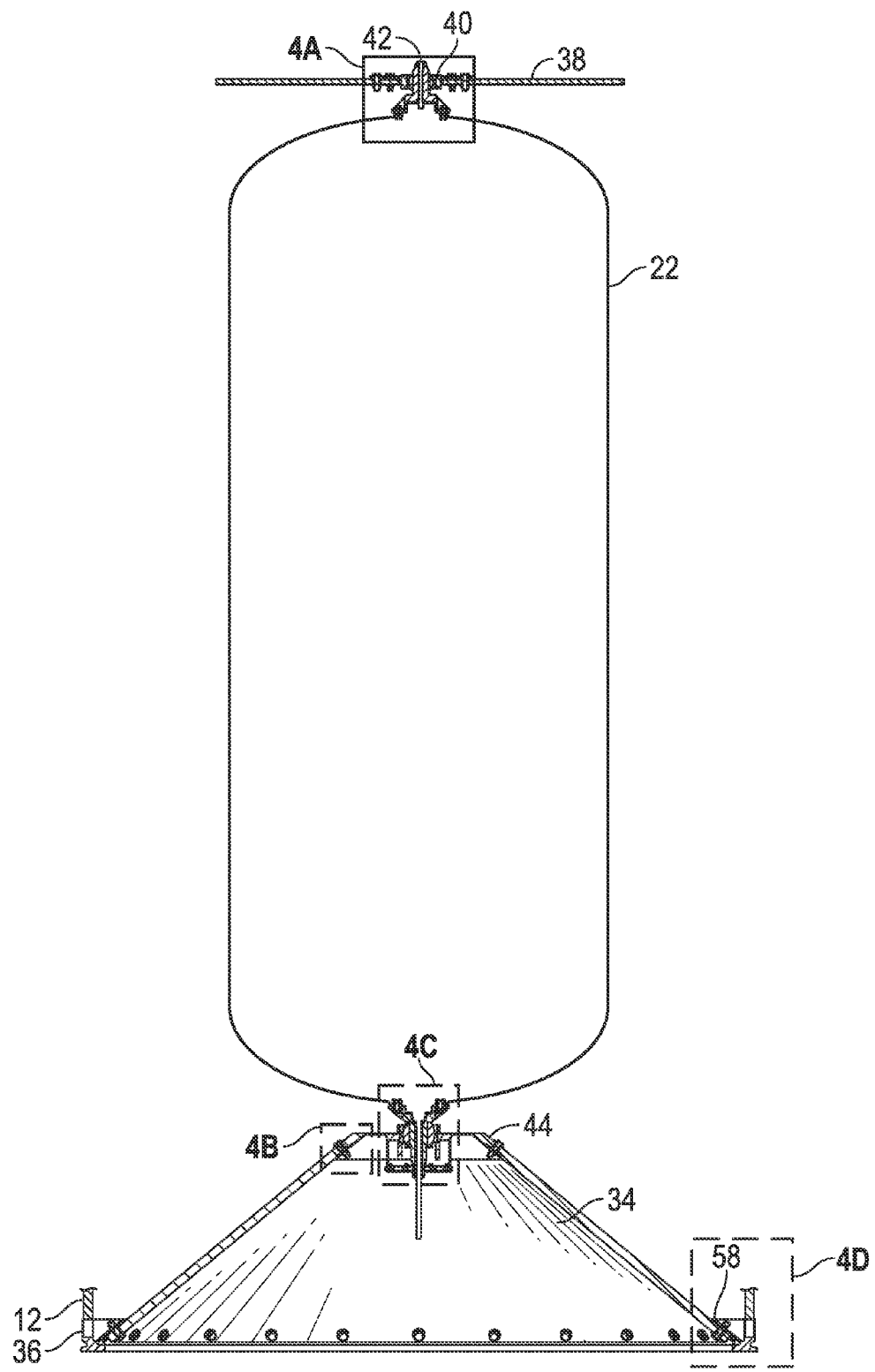
FIG. 4 is a side elevation in section of disclosed tank support structure of FIG. 1.
Figure 4A:
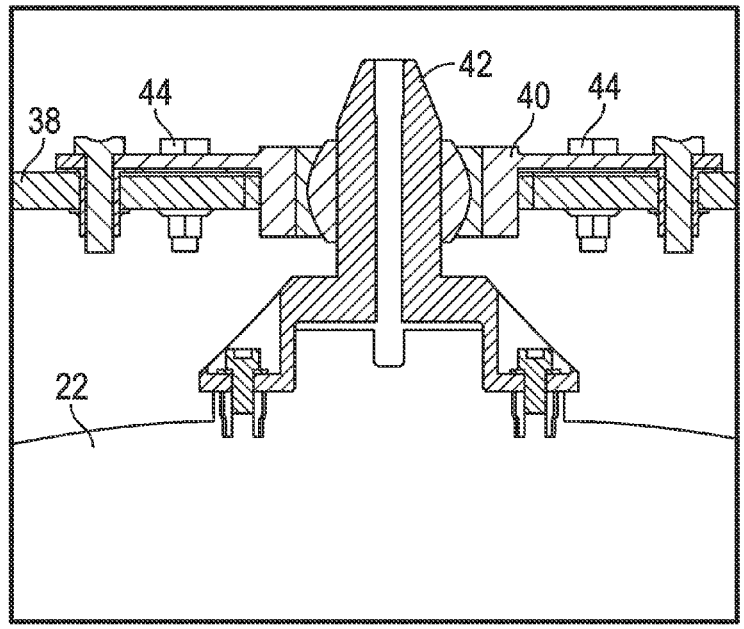
FIGS. 4A, 4B, 4C, and 4D are enlarged detail views, in section, of portions of the tank support structure shown in FIG. 4.

As shown in FIGS. 4 and 4A, the propellant tank 22 may include an axially extending forward tank boss 42 that may extend through and is captured by the monoball bearing joint 40. The monoball bearing joint 40 may be attached to the forward tank support panel 38 by fasteners such as bolts 44. In other embodiments, the monoball bearing joint 40 may be attached to the forward tank support panel 38 by a suitable adhesive, by welding, by rivets, or a combination of the foregoing. The monoball bearing joint 40 may be made of metal, such as an aluminum alloy or titanium.

Figure 4B:
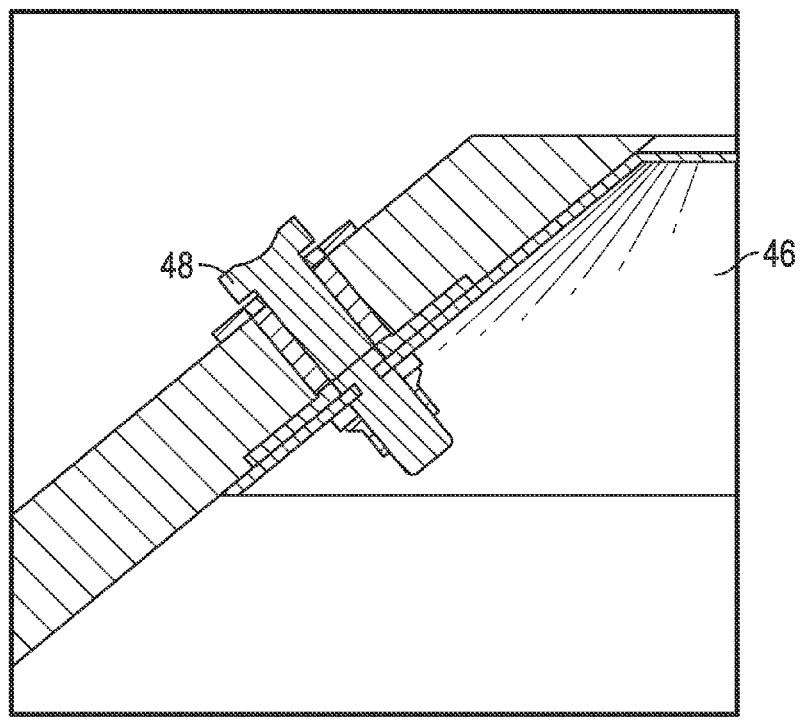
Figure 4C:
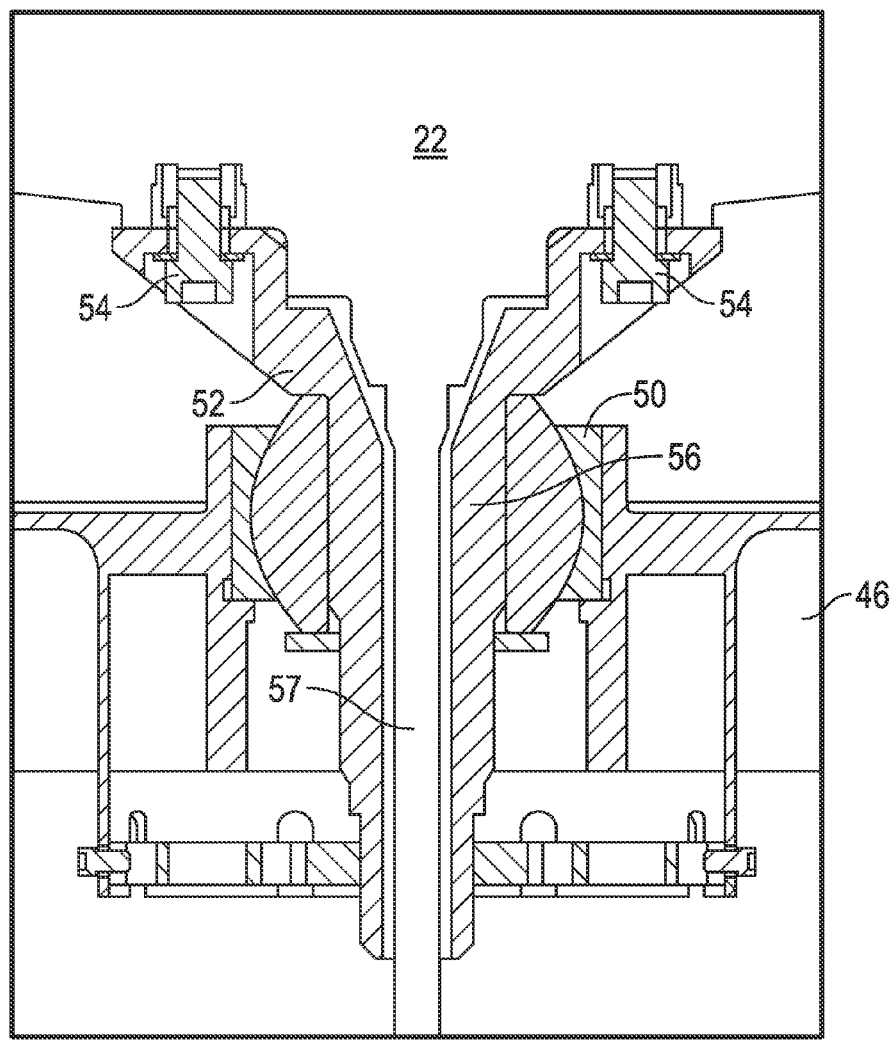

As shown in FIGS. 4 and 4B, the upper end 44 of the conical shell 34 may be attached to a cap 46 that may be made of a hardened material such as titanium or other metal. The attaching mechanism may be by adhesives, or bolts 48 as shown in FIG. 4B. As shown in FIGS. 4 and 4C, the cap 46 may include a pivotal mount 50, such as the moment-free monoball bearing mount shown. Monoball bearing mount 50 may receive an aft tank boss 52 of the propellant tank 22. The aft tank boss 52 may be attached to the propellant tank by screws 54 and may include an adapter tube 56 that extends through and is captured by the monoball bearing mount 50. The tube 56 may be hollow and shaped to receive an outlet tube 57 of the propellant tank 22. In one embodiment, the tube 56 may be slidable relative to the monoball bearing mount to allow for expansion and contraction of the propellant tank 22, and accommodate any out-of-tolerance conditions. Similarly, the forward tank boss 42 (FIG. 4A) may be slidably retained by the monoball bearing slip joint 40. In embodiments, both joints 40 and 50 may allow axial (i.e., in the direction of the longitudinal axis of the spacecraft 10) and pivotal movement of the propellant tank 22 relative to the spacecraft 10, central thrust tube 12 and conical support 34.

Figure 4D:
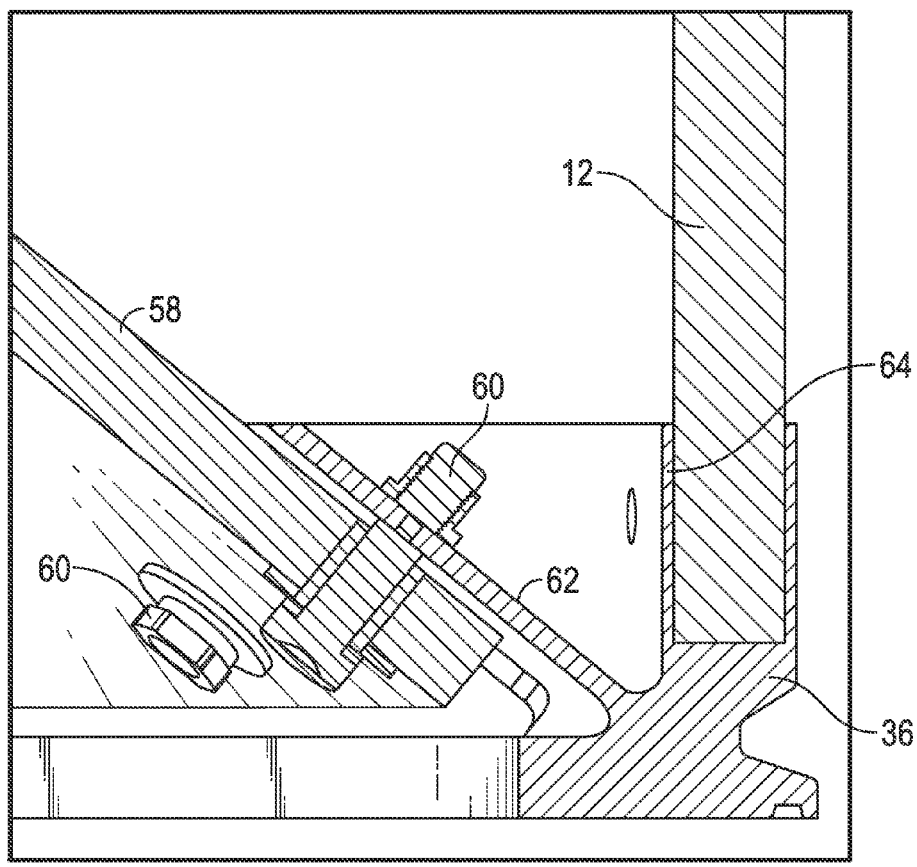

As shown in FIGS. 4 and 4D, the lower end 58 of the conical shell 34 may be attached to the launch vehicle interface ring 36 by bolts 60 that extend through the lower end and through tabs 62 formed on the interface ring 36. As shown in FIG. 4D, the interface ring 36 also may include an angular slot 64 shaped to receive the bottom of the central thrust tube 12 (FIG. 1), and the joint may be secured by means such as an adhesive, welding or brazing, mechanical fasteners such as screws (not shown), or a combination of the foregoing.

Figure 2:
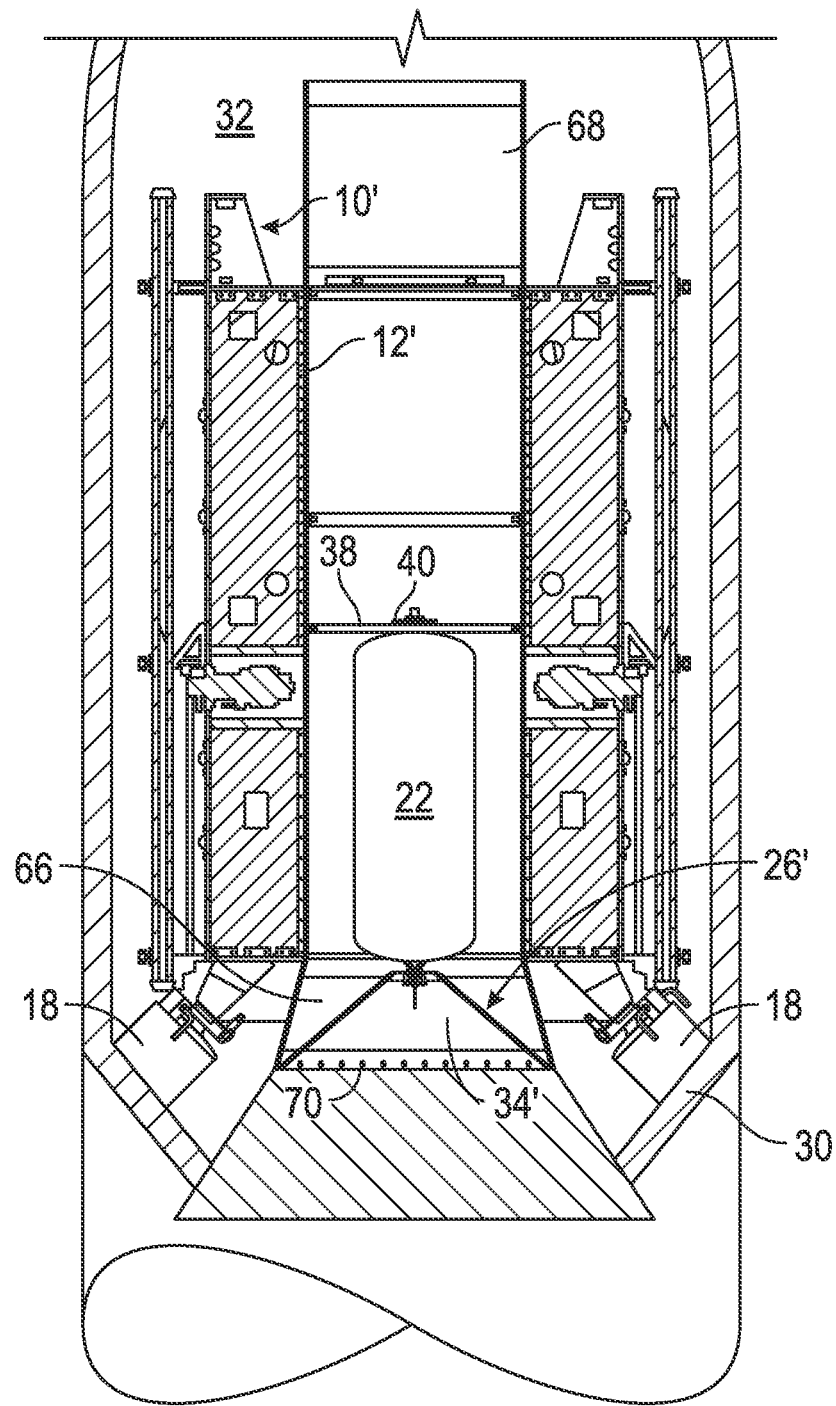
FIG. 2 is a side elevation in section of a second embodiment of a spacecraft incorporating the disclosed tank mount, shown incorporated in a larger launch vehicle fairing.

As shown in FIG. 2, a spacecraft 10' may include a central thrust tube 12' that is flared outwardly at the bottom of 66 to accommodate a greater thrust load, in the event that the central thrust tube 12' may support the thrust tube 68 of a second spacecraft (not shown) to be launched in tandem with the spacecraft 10. In this embodiment, the propellant tank 22 may be supported in a similar fashion as that described with reference to FIG. 1, except that the conical shell 34' may be shaped to flare outwardly at a greater angle than shell 34 engage a larger interface ring 70.

The disclosed spacecraft 10, 10' and tank mount 26, 26' provide a low-cost mounting system that may transfer launch loads from the lower propellant tank nozzle 52 through the conical shell 34 and to the launch vehicle interface ring 36. Therefore, the launch load of the propellant tank 22 may be conveyed directly to the interface ring 36 without transferring a load to the central thrust tube 12. Because the connection between the propellant tank 22 and the forward tank support panel 38 is by way of a slip joint 40, there is not thrust load transmitted to the central thrust tube 12 at that location. Thus, the entire thrust load of the propellant tank may be borne by the interface ring 36 and not the structural frame of the spacecraft 12, 12'. Further, because the propellant tank is attached to the spacecraft 12, 12' at its upper and lower ends by boss 42 and nozzle 56, the support system will accommodate a variety of propellant tank dimensions and diameters.

While the forms of apparatus and method described herein may constitute preferred embodiments of the spacecraft and propellant tank mount system, it is to be understood the invention is not limited to these precise forms of apparatus, and that changes may be made therein without departing from the scope of the invention.

What is claimed is:

1. A spacecraft configured to be positioned within a launch vehicle, the spacecraft having a primary structural frame and a propellant tank, the spacecraft comprising:
   a tank mount engaging a portion of the propellant tank;
   a plurality of thrusters;
   a central thrust tube that is the primary structural frame of the spacecraft and provides support to the plurality of thrusters, the propellant tank shaped to fit within and not contact the central thrust tube directly; and
   a launch vehicle interface ring, the tank mount configured to transfer launch loads directly from the propellant tank to the launch vehicle interface ring and not the central thrust tube.

2. The spacecraft of claim 1, wherein the tank mount is conical in shape.

3. The spacecraft of claim 1, wherein the tank mount includes a conical shell.

4. The spacecraft of claim 3, wherein the tank mount includes a pivotal mount attached to the propellant tank and the conical shell.

5. The spacecraft of claim 4, wherein the pivotal mount includes a monoball bearing mount.

6. The spacecraft of claim 3, wherein the conical shell is formed of a composite material.

7. The spacecraft of claim 3, wherein the conical shell if formed of one or more of graphite, carbon fiber, titanium, steel and aluminum alloy.

8. The spacecraft of claim 3, wherein the conical shell has a honeycomb structure.

9. The spacecraft of claim 3, wherein the conical shell includes a lower peripheral edge shaped to engage the launch vehicle interface ring.

10. The spacecraft of claim 9 wherein the lower peripheral edge is mechanically attached to the launch vehicle interface ring.

11. The spacecraft of claim 10 wherein the tank mount includes a plurality of bolts mechanically attaching the lower peripheral edge to the launch vehicle interface ring.

12. The spacecraft of claim 1, wherein the propellant tank is generally one of spherical, elliptical, cylindrical and oval in shape.

13. The spacecraft of claim 12, wherein the propellant tank is configured to retain xenon gas propellant.

14. The spacecraft of claim 1, further comprising a forward tank support panel for supporting an end of the propellant tank opposite the tank support, the forward tank support panel being shaped to engage the primary structural frame.

15. The spacecraft of claim 14, wherein the forward tank support panel includes a pivotal mount attached to the propellant tank.

16. The spacecraft of claim 15, wherein the pivotal mount includes a monoball bearing.

17. The spacecraft of claim 16, wherein the propellant tank includes axially extending forward tank boss, and the monoball bearing is shaped to receive the forward tank boss for relative slidable and pivotal movement.

18. A method of mounting a propellant tank to a spacecraft, wherein the spacecraft includes a primary structural frame and a plurality of thrusters, the method comprising:
   providing a tank support to engage a portion of the propellant tank;
   providing support to the plurality of thrusters by a central thrust tube that is the primary structural frame of the spacecraft, the propellant tank shaped to fit within and not contact the central thrust tube directly; and
   transferring launch loads directly from the propellant tank to a launch vehicle interface ring and not the central thrust tube by the tank support.

* * * * *